United States Patent [19]

Farineau

[11] Patent Number: 5,112,009
[45] Date of Patent: May 12, 1992

[54] PITCH CONTROL SYSTEM FOR AIRCRAFT

[75] Inventor: Jacques Farineau, Toulouse, France

[73] Assignee: Societe Anonyme dite: Aerospatiale Societe Nationale Industrielle, Paris, France

[21] Appl. No.: 690,310

[22] Filed: Apr. 24, 1991

[30] Foreign Application Priority Data

Apr. 24, 1990 [FR] France ................. 90 05227

[51] Int. Cl.$^5$ .................. B64C 9/34; B64C 13/16; G05D 1/08
[52] U.S. Cl. .................. 244/75 R; 244/90 A; 244/181; 244/203; 244/213
[58] Field of Search ............ 244/76 R, 75 R, 213, 244/90 A, 90 R, 48, 177, 178, 181, 193, 195, 203

[56] References Cited

U.S. PATENT DOCUMENTS

| | | | |
|---|---|---|---|
| 3,142,457 | 7/1964 | Quenzler | 244/203 |
| 3,167,276 | 1/1965 | Moosbrugger et al. | 244/181 |
| 3,942,746 | 3/1976 | Carter et al. | 244/110 D |
| 4,003,533 | 1/1977 | Carter et al. | 244/110 D |
| 4,142,699 | 3/1979 | Arnquist et al. | 244/213 |
| 4,261,537 | 4/1981 | Tisdale, Sr. et al. | 244/195 |
| 4,442,490 | 4/1984 | Ross | 244/181 |
| 4,485,446 | 11/1984 | Sassi | 244/181 |
| 4,569,494 | 2/1986 | Sakata | 244/75 R |
| 4,744,532 | 5/1988 | Ziegler et al. | 244/75 R |
| 4,956,780 | 9/1990 | Sankrithi et al. | 244/181 |

Primary Examiner—Joseph F. Peters, Jr.
Assistant Examiner—Virna Lissi Mojica
Attorney, Agent, or Firm—Marshall, O'Toole, Gerstein, Murray & Bicknell

[57] ABSTRACT

A pitch control system for an aircraft flying at a Mach number greater than 0.7 and including a horizontal plane that is adjustable in deflection and air brakes having a nose-down effect. According to the invention, the system comprises:

first means providing the aerodynamic incidence ($\alpha$) of said aircraft at each instant;

second means for generating a nose-down first command ($\Delta iHC$) for said adjustable horizontal plane when said aerodynamic incidence is greater than said first threshold ($\alpha 0$), the amplitude of said first command being such that if said adjustable horizontal plane were to take up the corresponding position instantaneously, it would compensate the increase in the nose-up effect on said aircraft due to the way in which said aerodynamic pitching couple varies above said first threshold;

third means for generating a signal ($\Delta iHe$) representative of the deflection response rate of said adjustable horizontal plane in response to said first command;

fourth means for forming the difference $d(\Delta iH)$ between said first command ($\Delta iHc$) and said signal ($\Delta iHe$) representative of the response of said adjustable horizontal plane; and fifth means for responding to said difference $d(\Delta iH)$ to generate a nose-down second command for said air brakes having a nose-down effect.

9 Claims, 2 Drawing Sheets

PITCH CONTROL SYSTEM FOR AIRCRAFT

The present invention relates to a pitch control system for aircraft flying at a Mach number greater than 0.7.

BACKGROUND OF THE INVENTION

Under such circumstances, the pitching aerodynamic couple on the aircraft varies as a function of its aerodynamic incidence in such a manner that:

below a first incidence threshold said aerodynamic pitching couple decreases with increasing aerodynamic incidence and increases with decreasing aerodynamic incidence;

between said first incidence threshold and a second incidence threshold greater than said first threshold, said aerodynamic pitching couple increases with increasing aerodynamic incidence and decreases with decreasing aerodynamic incidence; and above said second incidence threshold said aerodynamic pitching couple decreases with increasing aerodynamic incidence and increases with decreasing aerodynamic incidence.

Consequently, if the aerodynamic incidence of the aircraft accidentally exceeds said first threshold, the aircraft enters a domain of unstable flight in which any increase in incidence causes the aerodynamic pitching couple to increase which in turn increases the angle of incidence. As a result, the aircraft suddenly pitches nose up, and this may be followed by the aircraft suddenly pitching nose down when said second threshold is exceeded, thus producing great discomfort for the passengers of the aircraft.

An object of the present invention is to remedy this drawback for an aircraft having a horizontal plane of adjustable deflection and air brakes that tend to pitch the aircraft nose down when in the deployed position.

SUMMARY OF THE INVENTION

To this end, the present invention provides a pitch control system for an aircraft flying at a Mach number greater than 0.7 and including a horizontal plane that is adjustable in deflection and air brakes that have a nose-down effect, the aerodynamic pitching couple on said aircraft varying as a function of its aerodynamic incidence in such a manner that:

below a first incidence threshold said aerodynamic pitching couple decreases with increasing aerodynamic incidence and increases with decreasing aerodynamic incidence;

between said first incidence threshold and a second incidence threshold greater than said first threshold, said aerodynamic pitching couple increases with increasing aerodynamic incidence and decreases with decreasing aerodynamic incidence; and above said second incidence threshold said aerodynamic pitching couple decreases with increasing aerodynamic incidence and increases with decreasing aerodynamic incidence;

wherein the system comprises:

first means providing the aerodynamic incidence of said aircraft at each instant;

second means for generating a nose-down first command for said adjustable horizontal plane when said aerodynamic incidence is greater than said first threshold, the amplitude of said first command being such that if said adjustable horizontal plane were to take up the corresponding position instantaneously, it would compensate the increase in the nose-up effect on said aircraft due to the way in which said aerodynamic pitching couple varies above said first threshold;

third means for generating a signal representative of the deflection response rate of said adjustable horizontal plane in response to said first command;

fourth means for forming the difference between said first command and said signal representative of the response of said adjustable horizontal plane; and fifth means for responding to said difference to generate a nose-down second command for said air brakes having a nose-down effect.

Thus, according to the invention, the tendency of the aircraft to pitch suddenly nose up on exceeding said first incidence threshold is compensated by a nose-down command applied to the adjustable horizontal plane and to the air brakes that produce a nose-down effect. If the aircraft pitches nose up too quickly for it to be possible to provide compensation instantly by means of said adjustable horizontal plane (which operates relatively slowly), said air brakes instantly provide additional compensation since they can be deployed quickly. It is thus preferable to use the adjustable horizontal plane to eliminate inversions in the way aerodynamic pitching couple varies as a function of aerodynamic incidence, but if said adjustable horizontal plane is not fast enough, then the air brakes provide the required effect temporarily.

In order to anticipate the nose-up correction applied to the aircraft, it is preferable to provide an adder between said first and second means, the adder adding a phase advance component to said aerodynamic incidence.

Such a phase advance component may be proportional to the pitching rate of the aircraft. In a variant it may be proportional to the derivative of the aerodynamic incidence of the aircraft.

Advantageously, said second means are constituted by a table causing values of the aerodynamic incidence of the aircraft to correspond to deflection values for said adjustable horizontal plane, said deflection values being zero when the aerodynamic incidence is less than said first threshold.

In order to take account of the speed with which the adjustable horizontal plane can be deployed, a device is included between said second means and said adjustable horizontal plane to limit the rate at which said first command varies as a function of the real deflection rate capability of said adjustable horizontal plane.

Further, said third means are constituted by a simulator device for simulating the deflection response rate of said adjustable horizontal plane, said third means receiving said first command. Such a simulator device may be constituted, for example, by calculation or tabulation means incorporating the transfer function of said adjustable horizontal plane.

Preferably, said fifth means are constituted by a table causing positive values of said difference to correspond to deflection values of said air brakes having a nose-down effect, said deflection values being zero for zero or negative values of said difference.

As described below, when said aircraft also includes air brakes that have a nose-up pitching effect, it is advantageous for the system of the invention to include sixth means responsive to said difference to generate a nose-up third command for said air brakes having a nose-up effect. Advantageously, said sixth means are constituted by a table causing negative values of said difference to correspond to deflection values for said air brakes having a nose-up effect, said deflection values being zero for zero or positive values of said difference.

The present invention also provides an aircraft for flying at a Mach number higher than 0.7 and including a horizontal plane that is adjustable in deflection and air brakes having a nose-down effect, said aircraft including a pitch control system as specified above.

BRIEF DESCRIPTION OF THE DRAWINGS

An embodiment of the invention is described by way of example with reference to the accompanying drawings, in which.

When identical references are used in more than one of the figures, they designate items that are similar.

MORE DETAILED DESCRIPTION

Figure 1:
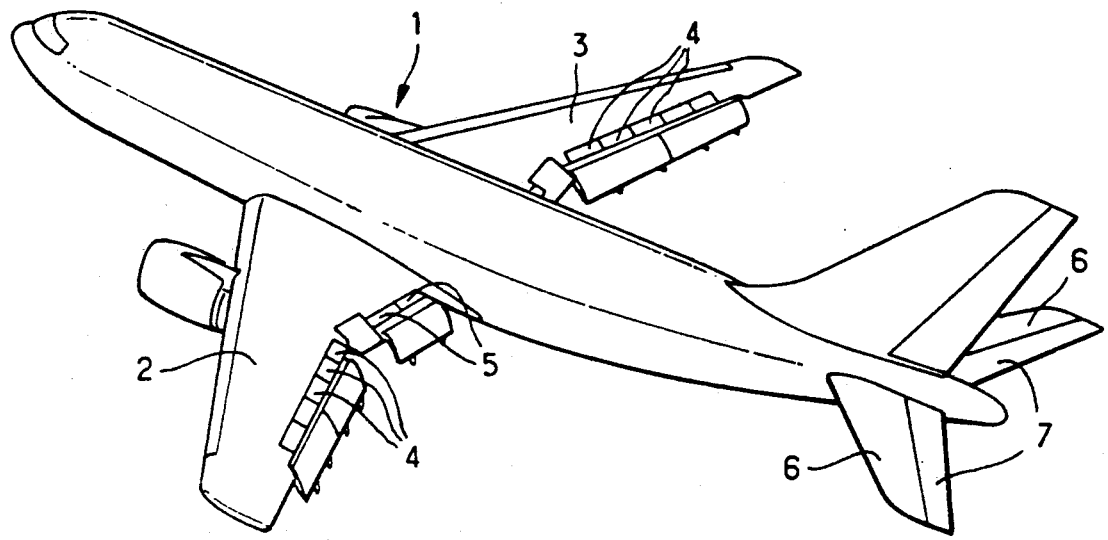
FIG. 1 is a diagrammatic perspective view of an aircraft suitable for being improved by the present invention.

The large-capacity civil aircraft 1 shown in FIG. 1 is capable of flying at high Mach numbers (greater than 0.7) and it includes numerous moving aerodynamic control surfaces (flaps, ailerons, etc. . . . ) on its wings 2 and 3, including air brakes 4 and air brakes 5. In addition to their braking effect, when the air brakes 4 are in their deployed position they also have a nose-up effect, whereas when the air brakes 5 are in their deployed position they have a nose-down effect in addition to their braking effect. In addition, the tail plane 6 on which the elevator 7 is mounted is controllable in deflection, i.e. it is made in the form of an adjustable horizontal plane or stabilizer.

In conventional manner, the deployment speed of the nose-up effect air brakes 4 and the nose-down effect air brakes 5 is very high (it is not less than 30°/sec), however these air brakes 4 and 5 cannot be used for extended periods for their nose-up or nose-down properties (except during braking), since aircraft performance is greatly degraded by their braking action, and in addition, actuating them gives rise to vibrations which constitute a source of discomfort for passengers.

Also in conventional manner, the speed at which the adjustable horizontal plane 6 can be deflected is low, e.g. about 0.5°/sec, such that the adjustable horizontal plane 6 cannot be immediately effective in compensating a sudden change in the incidence of the aircraft 1.

Figure 2:
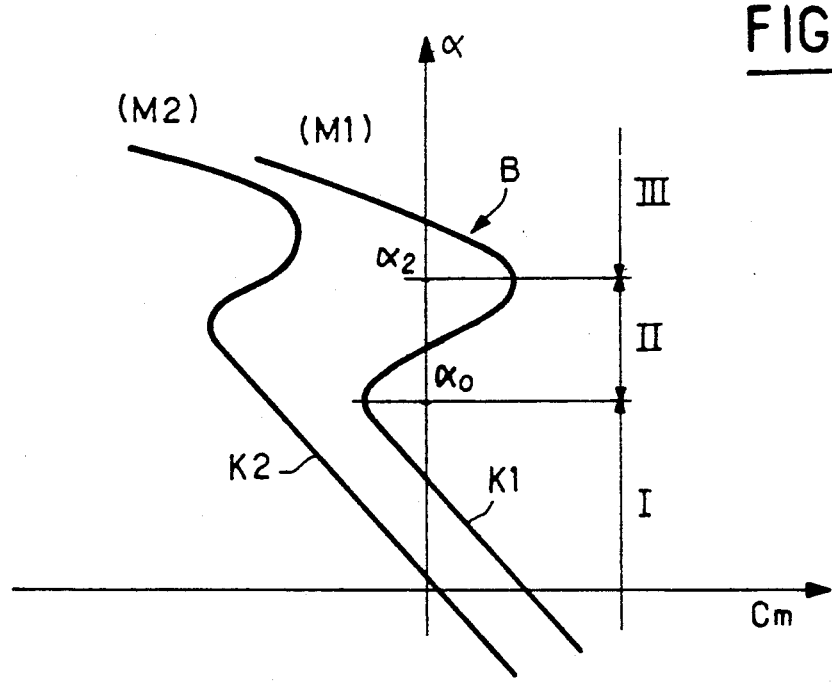
FIG. 2 is a graph showing how the aerodynamic pitching couple on said aircraft varies as a function of its aerodynamic incidence.

If, as shown in the graph of FIG. 2, variation in the aerodynamic pitching couple Cm on the entire aircraft 1 at a fixed position of the adjustable horizontal plane 6 is investigated as a function of the aerodynamic incidence $\alpha$ of said aircraft, then a curve K is obtained similar to the curve K1 of FIG. 2, which curve comprises three zones I, II, and III separated by incidence thresholds $\alpha 0$ and $\alpha 2$ and corresponding to different types of behavior for the aircraft 1.

In the zone I, where the aerodynamic incidence $\alpha$ is less than the first threshold $\alpha 0$, variation in the aerodynamic pitching couple Cm is at least more or less inversely proportional to the aerodynamic incidence $\alpha$.

Thus, if the incidence $\alpha$ increases, then the couple Cm decreases, i.e. the aircraft nose goes down, thereby causing the incidence to decrease. Conversely, if the incidence $\alpha$ decreases, then the couple Cm increases, the aircraft nose goes up and the incidence increases. In the zone I, flight of the aircraft 1 is thus stable with any departure from equilibrium creating an effect that tends to return the aircraft to equilibrium. The zone I thus corresponds to the domain of normal flight for the aircraft 1 in which the aircraft is longitudinally stable.

In the zone II, where the aerodynamic incidence $\alpha$ is greater than the first threshold $\alpha 0$ but less than the second threshold $\alpha 2$, variation in the aerodynamic pitching couple Cm becomes at least more or less directly proportional to the aerodynamic incidence $\alpha$. Consequently, if the incidence $\alpha$ increases, then the couple Cm increases, thus raising the nose of the aircraft which has the effect of further increasing the incidence. Conversely, if the incidence $\alpha$ decreases, then the couple Cm also decreases such that the nose of the aircraft 1 goes down, thereby further decreasing the incidence. Under such circumstances, pitching motion of the aircraft 1 is divergent, with any departure from equilibrium creating an effect which tends to move the aircraft 1 further from said equilibrium.

Finally, in the zone III, where the aerodynamic incidence $\alpha$ is greater than the second threshold $\alpha 2$, variation in the aerodynamic pitch couple Cm is again substantially inversely proportional to the aerodynamic incidence $\alpha$, as in the zone I, but with greater sensitivity since a small change in incidence corresponds to a larger change in the couple Cm. The zone III thus also corresponds to a domain of stable flight.

Thus, because of the zone of instability II, the curve K1 has a bulge B disposed astride said second threshold $\alpha 2$ and representing a double inversion of the way in which the couple Cm varies as a function of the incidence $\alpha$.

This double inversion is due to a phenomenon which is purely aerodynamic. It appears at a high Mach number (greater than 0.7) and the higher the Mach number at which it appears the more pronounced the effect. Further, the higher the Mach number, the lower the first incidence threshold $\alpha 0$. This is illustrated in FIG. 2 which has a curve K2 analogous to the curve K1, but corresponding to a Mach number M2 which is lower than the Mach number M1 associated with the curve K1.

In cruising flight of the aircraft 1, its incidences are selected to lie in the zone I below the first threshold $\alpha 0$, such that the double inversion in the way the couple Cm varies generally does not occur during flight of said aircraft. However, when cruising at a high Mach number, circumstances may arise in which this effect disturbs flight. For example, under manual control:

a) the pilot of the aircraft 1 pulls on the control stick, thereby increasing the incidence so that it exceeds the first threshold $\alpha 0$. As a result the aircraft 1 pitches suddenly nose up (zone II) until the incidence reaches the second threshold $\alpha 2$, whereupon it pitches just as suddenly nose down (zone III); or b) the aircraft 1 encounters atmospheric turbulence that has the effect either of increasing the incidence, or the Mach number, or both, such that the incidence $\alpha$ becomes greater than the first threshold $\alpha 0$. The aircraft 1 then tends to start pitching as in a) above.

In either case, the load factor applied to the aircraft 1 during such pitching takes on high values that may exceed 2 g, thereby giving rise to considerable passenger discomfort.

An object of the present invention is to avoid this discomfort by improving the behavior of the aircraft 1 on going through the bulge B.

Figure 3:
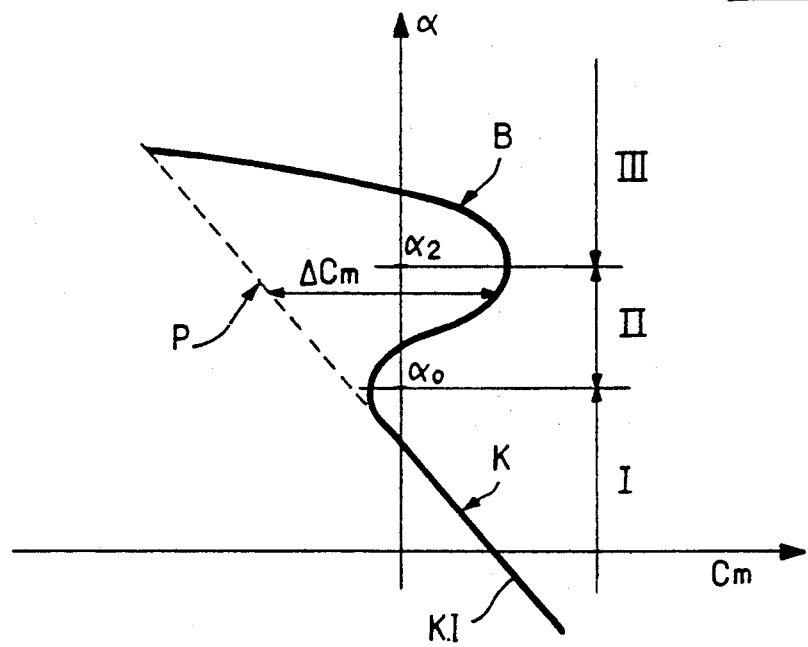
FIG. 3 is a graph similar to FIG. 2 showing how the system of the present invention operates.

To do this, and as illustrated by the graph of FIG. 3, the invention makes it possible to extend the zone I portion K.I of the curve K past the bulge B. The extension P obtained in this way (dashed line) enables said portion K.I of the curve to meet the portion of the curve K that lies in the zone III, thereby short circuiting the bulge B. In other words, a quantity $\Delta Cm$ is subtracted from the nose-up couple Cm at each value of the aerodynamic incidence $\alpha$ that is greater than the first threshold $\alpha 0$, in such a manner that $(Cm - \Delta Cm)$ varies along the extension P. The bulge B is thus eliminated and can be made transparent for the pilot. The aircraft 1 is thus stabilized in incidence, even at values of incidence that are greater than the first threshold $\alpha 0$.

Figure 4:
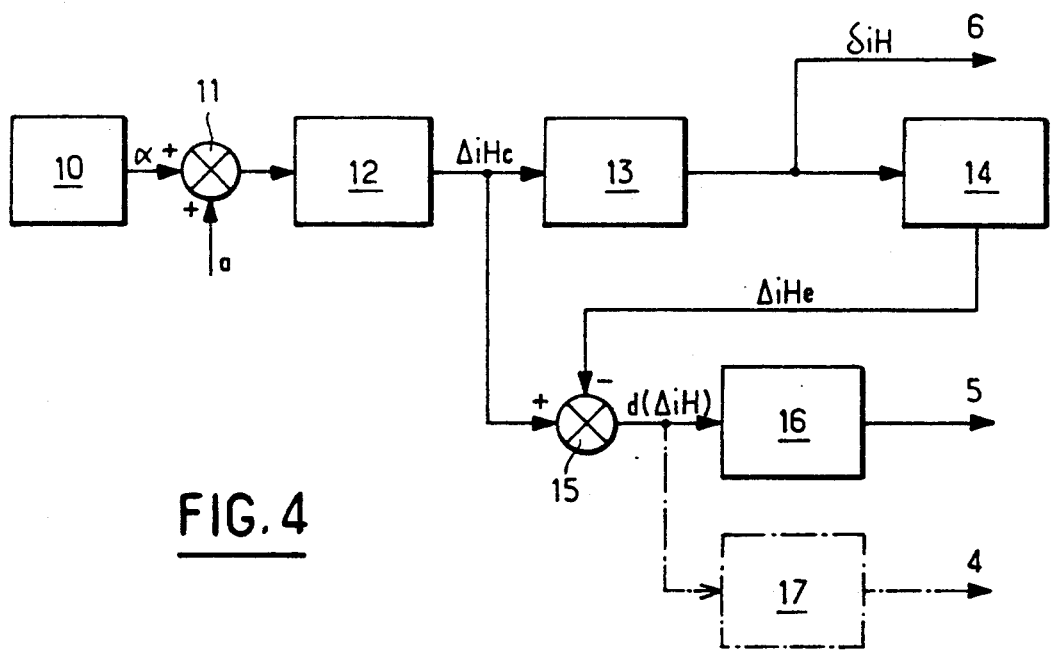
FIG. 4 is a block diagram of an embodiment of the present invention.

FIG. 4 is a block diagram of an implementation of a system of the present invention suitable for obtaining the operation shown in FIG. 3. This system includes a probe 10 for delivering the aerodynamic incidence $\alpha$ of the aircraft 1. An adder 11 adds a phase advance component a to this aerodynamic incidence $\alpha$. The component a may be proportional to the pitch rate (or speed), or else to the derivative of the aerodynamic incidence $\alpha$, and it is generated by a device that is not shown.

The aerodynamic incidence $\alpha$ plus the phase advance component a is transmitted to a table look-up device 12 which provides values $\Delta iHc$ that correspond to the values $(\alpha + a)$ as follows:

if $(\alpha + a)$ is less than $\alpha 0$, then $\Delta iHc$ is zero;

if $(\alpha + a)$ is greater than $\alpha 0$, then $\Delta iHc$ is equal to the nose-down deflection that the adjustable horizontal stabilizer 6 needs to take up to compensate for the nose-up effect applied to the aircraft 1 by virtue of the incidence threshold $\alpha 0$ being exceeded.

The values $\Delta iHc$ thus constitute commands for the adjustable horizontal stabilizer 6. In order to take account of the slowness with which the stabilizer moves, the values $\Delta iHc$ are applied to said adjustable horizontal stabilizer 6 via a limiter device 13 which matches the rate of change in the signal $\Delta iHc$ to the real capabilities of the adjustable horizontal stabilizer 6. Thus, the device 13 converts the signal $\Delta iHc$ into a signal $\delta iH$ which varies at a rate that is adapted to the adjustable horizontal stabilizer 6, and which is applied thereto.

In addition, the system of the invention includes a device 14 which delivers a signal $\Delta iHe$ representative of the instantaneous nose-down deflection position occupied by the adjustable horizontal stabilizer 6 in response to the signal $\delta iH$. The device 14 may be a simulator device incorporating the transfer function of the adjustable horizontal stabilizer 6 and providing a value of the signal $\Delta iHe$ corresponding to each value of the signal $\delta iH$. The device 14 may be constituted by a table look-up device including such a correspondence table.

A subtractor 15 subtracts the signal $\Delta iHe$ generated by the device 14 from the signal $\Delta iHc$ generated by the table look-up device 12. It may be observed that the difference $d(\Delta iH)$ obtained in this way corresponds to the instantaneous lack of nose-down effect from the adjustable horizontal stabilizer 6 for compensating the nose-up effect on the aircraft 1, which lack is due to the slowness with which said adjustable horizontal stabilizer 6 moves.

Thus, in order to compensate for the slowness in the reaction time of the adjustable horizontal stabilizer 6, said difference $d(\Delta iH)$ is applied to the nose-down effect air brakes 5 via a device 16 which transforms said difference into a nose-down deflection command therefor. The device 16 includes a table which provides a nose-down deflection value for the air brakes 5 corresponding to any positive value of said difference, and which provides zero nose-down deflection values if said difference is zero or negative.

With the system of the invention, it can be seen that:

the nose-up effect on the aircraft 1 is compensated mainly by the nose-down effect of the deflection applied to the adjustable horizontal stabilizer 6;

the nose-down effect air brakes 5 provide a nose-down effect to make up for the instantaneous lack of nose-down effect due to the adjustable horizontal stabilizer 6 moving at a limited speed; and the action of the nose-down effect air brakes 5 falls off progressively as the adjustable horizontal stabilizer 6 moves into position.

It may be observed that the difference $d(\Delta iH)$ may be negative when the incidence $\alpha$ returns from values greater than $\alpha 0$ to values less than $\alpha 0$, with the adjustable horizontal stabilizer 6 being in a nose-down position. If such a return to values of $\alpha$ less than $\alpha 0$ takes place quickly, it is necessary to return the adjustable horizontal stabilizer 6 fairly fast to its initial position (prior to taking up a position having a nose-down effect). However, because of its operating inertia, the adjustable horizontal stabilizer 6 cannot return quickly to its initial position. Under such circumstances, a transient lack of nose-up effect appears in the zone I of the curve K. To eliminate this effect, a device 17 is provided which receives the signal $d(\Delta iH)$ and which generates a nose-up deflection command for the nose-up effect air brakes 4. The device 17 includes a table causing such negative values of said difference $d(\Delta iH)$ to correspond to nose-up command values, with such nose-up command values being zero whenever said difference is positive or zero.

I claim:

1. A pitch control system for an aircraft flying at a Mach number greater than 0.7 and including a horizontal plane that is adjustable in deflection and air brakes that have a nose-down effect, the aerodynamic pitching couple (Cm) on said aircraft varying as a function of its aerodynamic incidence ($\alpha$) in such a manner that:

below a first incidence threshold ($\alpha 0$) said aerodynamic pitching couple decreases with increasing aerodynamic incidence and increases with decreasing aerodynamic incidence;

between said first incidence threshold ($\alpha 0$) and a second incidence threshold ($\alpha 2$) greater than said first threshold, said aerodynamic pitching couple increases with increasing aerodynamic incidence and decreases with decreasing aerodynamic incidence; and above said second incidence threshold ($\alpha 2$) said aerodynamic pitching couple decreases with increasing aerodynamic incidence and increases with decreasing aerodynamic incidence;

wherein the system comprises:

first means providing the aerodynamic incidence ($\alpha$) of said aircraft at each instant;

an adder for adding a phase advance component (a) to said aerodynamic incidence ($\alpha$);

second means for generating a nose-down first command ($\Delta iHc$) for said adjustable horizontal plane when said aerodynamic incidence is greater than said first threshold ($\alpha 0$), the amplitude of said first command being such that if said adjustable horizontal plane were to take up the corresponding position instantaneously, it would compensate the increase in the nose-up effect on said aircraft due to the way in which said aerodynamic pitching couple varies above said first threshold;

third means for generating a signal ($\Delta iHe$) representative of the deflection response rate of said adjustable horizontal plane in response to said first command;

fourth means for forming the difference $d(\Delta iH)$ between said first command ($\Delta iHc$) and said signal ($\Delta iHe$) representative of the response of said adjustable horizontal plane; and fifth means for responding to said difference $d(\Delta iH)$ to generate a nose-down second command for said air brakes having a nose-down effect.

2. A system according to claim 1, wherein said fifth means are constituted by a table causing positive values of said difference $d(\Delta iH)$ to correspond to deflection values of said air brakes having a nose-down effect, said deflection values being zero for zero or negative values of said difference $d(\Delta iH)$.

3. A system according to claim 1, wherein said phase advance component is proportional to the pitching rate of the aircraft.

4. A system according to claim 1, wherein said phase advance component is proportional to the derivative of the aerodynamic incidence of the aircraft.

5. A system according to claim 1, wherein said second means are constituted by a table causing values of the aerodynamic incidence ($\alpha$) of the aircraft to correspond to deflection values for said adjustable horizontal plane, said deflection values being zero when the aerodynamic incidence ($\alpha$) is less than said first threshold ($\alpha 0$).

6. A system according to claim 1, including a device between said second means and said adjustable horizontal plane to limit the rate at which said first command varies as a function of the real deflection rate capability of said adjustable horizontal plane.

7. A system according to claim 1, wherein said third means are constituted by a device for simulating the deflection response rate of said adjustable horizontal plane, said third means receiving said first command.

8. A system according to claim 1, for use in an aircraft further including air brakes having a nose-up effect, the system including sixth means responsive to said difference $d(\Delta iH)$ to generate a nose-up third command for said air brakes having a nose-up effect.

9. A system according to claim 8, wherein said sixth means are constituted by a table causing negative values of said difference $d(\Delta iH)$ to correspond to deflection values for said air brakes having a nose-up effect, said deflection values being zero for zero or positive values of said difference $d(\Delta iH)$.

* * * * *